United States Patent [19]

Blodgett

[11] 4,164,260

[45] Aug. 14, 1979

[54] METHOD AND APPARATUS FOR CONTROLLING THE AVERAGE WEIGHTS OF COMMODITIES IN PACKAGE FORM

[75] Inventor: Stewart B. Blodgett, Houston, Tex.

[73] Assignee: Mira-Pak, Inc., Houston, Tex.

[21] Appl. No.: 871,335

[22] Filed: Jan. 23, 1978

[51] Int. Cl.² .............................................. G01G 19/52
[52] U.S. Cl. ............................................ 177/1; 177/50
[58] Field of Search ................................ 177/1, 50, 25

[56] References Cited

U.S. PATENT DOCUMENTS

| | | | |
|---|---|---|---|
| 3,108,647 | 10/1963 | Harmon et al. | 177/1 |
| 3,476,198 | 11/1969 | Francis | 177/50 |
| 3,643,752 | 2/1972 | Blodgett | 177/50 X |
| 3,805,903 | 4/1974 | Muskat et al. | 177/50 |
| 3,974,888 | 8/1976 | Murakami et al. | 177/50 X |

*Primary Examiner*—George H. Miller, Jr.
*Attorney, Agent, or Firm*—Larson, Taylor and Hinds

[57] ABSTRACT

A method and apparatus are provided for controlling the minimum and average weights of a product prior to packaging so as to assure that no charges are below a given minimum weight and to assure that the average weight of the charges is maintained at a predetermined level over the entire operating period of the machine producing the charges. After weighing, any charges under the minimum weight are brought up to weight by adding product. The deviation of the final weight of the charges from the average is then determined and an indication provided of the amount and direction of each deviation. All of these indications of the deviation from the average are summed to produce a running tally representative of the total net deviation from the average. The production of charges is correctively controlled when the summation exceeds a preselected level in either direction. An alarm may be energized and the system shut down when a further higher level is exceeded.

16 Claims, 3 Drawing Figures

METHOD AND APPARATUS FOR CONTROLLING THE AVERAGE WEIGHTS OF COMMODITIES IN PACKAGE FORM

FIELD OF THE INVENTION

The present invention relates to weighing charges of a commodity and more particularly to an improved method and apparatus for assuring accurate control of the average weight of such charges.

BACKGROUND OF THE INVENTION

A serious problem exists in controlling the feeding and weighing of individual weighments of commodities at practical production speeds while at the same time assuring that legal requirements are met without 'giving away' product. Variations in individual weighments are unavoidable. These variations are caused by factors such as changes in the amount of product reaching the scale after the cut-off signal is given to the feeding device, variations in product density, the hopper head load and the thickness of the product on the feeder troughs.

The laws of most states which deal with allowable package weights of consumer products are patterned after the "Model State Packaging and Labeling Regulation" as adopted by the National Conference on Weights and Measures which is sponsored by the National Bureau of Standards of the U.S. Department of Commerce. The 1976 edition of this regulation states, in Paragraph 12.1.1, that the variations from the declared net weight to be allowed in individual packages of consumer commodities "shall not be permitted to such extent that the average of the quantities in the packages of a particular commodity, or a lot of the commodity that is kept, offered, or exposed for sale, or sold, is below the quantity stated, and no unreasonable shortage in any package shall be permitted, even though overages in other packages in the same shipment, delivery or lot compensate for such shortage." The regulation also provides that "[t]he magnitude of variations permitted under Sections 12., 12.1., 12.1.1., and 12.1.2., of this regulation shall be those contained in the procedures and tables of the National Bureau of Standards Handbook 67, 'Checking Prepackaged Commodities'."

The average net weight of a group of packages is the quotient obtained by dividing the sum total of a group of net weights by the number of net weights. A weight control system providing optimum performance would maintain the average weight of all packages at the declared weight, but not below, and all "unreasonable" underweight charges would be corrected rather than rejected. The weight control system would thus be required to hold two variables, viz., the average weight and the underweight limit. There is interaction between these two variables. In this regard, if a control system should hold a particular average weight at the time the initial feed and weighing cycle is completed, this average will obviously be changed if any "unreasonable" shortages are either corrected or rejected. Stated simply, if the system provides for correcting underweight charges by adding product, the charges to which product has been added will clearly affect the overall average.

One can readily appreciate the considerable advantages of a weight control system that will assure the user of the system and the consumer of the product of absolute compliance because of the legal and goodwill implications. In this regard, a system which, by its inherent design, holds an average representing the weight of every package produced during the operation of the system would provide convincing evidence of an intent to comply with the law. On the other hand, one will also appreciate the very important advantages of a system which provides this kind of compliance without product "giveaway" in view of the very great economic cost of giveaway when many millions of packages are involved.

Other factors should also be considered. Thus, if the average net weight is to be maintained equal to or slightly above the declared quantity, it is necessary to provide a control system that is extremely accurate and responsive to very small errors. Further, if the net weight of a package is to be accurately controlled, the weight of the charge should be checked before the charge is placed in the package in that if the charge is weighed in the package the charge weight will be affected by uncontrolled variations in the package tare weight.

Conventional weight control systems that claim to control the average weight periodically check a sample of weighments, determine the amount of error in the sample and cause a correction in the weight set point to be made. The intent of such systems is to make a correction that will produce correct weights in the future. However, the correction does not necessarily make up for the extra product or the missing product that was in the packages prior to making the correction. Such "sampling" systems are thus based on the expectation that the errors will average out. However, there is no guarantee that this will happen and no indication that the desired average weight is being maintained. Moreover, as mentioned above, if the control system considers the initial weight of the charge and the charge is subsequently rejected or product is added to the charge, this change in the charge weight must be considered because the subsequent events referred to will necessarily alter the average. Thus, the control system must separately consider the initial weighment and the weight after correction. To explain, if only the final weighment is considered, the control system could, for example, be producing charges which are not up to weight and which are, therefore, subsequently corrected to end up "heavy". Under this circumstance, the control system would then erroneously provide for less product (in view of the heavy charges at final weight) when actually more product is needed (in view of the fact that the packages being produced are light prior to the addition of product in the correcting step).

As will appear from the discussions hereinbelow, one aspect of the present invention concerns summing, algebraically, the deviations from the desired average to be maintained. There are prior art systems which, in effect, provide algebraic summation of a deviation from a desired weight over a predetermined sampling period. An example of such a system is that disclosed in U.S. Pat. No. 2,697,580 (Howard). However, such systems clearly suffer the disadvantages of the sampling-type systems discussed hereinabove, i.e., the systems provide corrections based on the events taking place during each sampling period and actually ignore the previous history of the operation prior to the particular sample in question. Stated differently, with such systems the results of each individual sample is, in essence, thrown out or discarded after the indicated action has been taken so that the next sample is not based on the first sample but rather is exclusively concerned with the events taking place during its sampling period. Thus, as stated, there is simply no assurance with systems of this type that the desired overall average is being maintained.

Other patents of possible interest relative to the present invention include U.S. Pat. Nos. 2,076,617 (Cleaves), 2,538,346 (Wood), 2,354,087 (Taymer), 2,037,484 (Raymer et al), 3,274,377 (Morison), 3,724,569 (Blodgett), 3,643,752 (Blodgett), 2,688,459 (Merrill et al), 2,628,055 (Knobel et al), and 3,862,666 (Muskat et al) although it is not represented that this listing is complete or that closer prior art does not exist.

SUMMARY OF THE INVENTION

In accordance with the present invention an improved method for monitoring and controlling the average net weight of charges of commodities is provided which maintains a continuous sum of each weighment produced over the operating period of the machine producing the charges. The invention provides correction signals when the weight of the charges departs from the desired average by given limits and, in addition, advantageously provides an alarm, shut-down or like signal when the weights depart from given, higher limits.

In general, the present invention provides for control of the average weights to extremely close limits by maintaining a continuous summation of each weighment and providing control signals when predetermined small departures from the desired average weight are detected. Thus, a continuous summation of each weighment is produced by accumulating the sum of the plus and minus deviations from the desired average in a register or the equivalent. Corrective action is initiated each time the algebraic sum in the register reaches a given level. Further, corrective action can also be initiated when the sum reaches a further higher level or levels. As noted above, warning signals, shutdown signals and the like can also be initiated as yet higher given levels. Extreme accuracy is provided by the invention because the weight of each charge produced is reflected in the sum in the register. Moreover, corrective action is introduced before the sum represents a large departure from the average. It will be appreciated that in a typical system, the given level at which corrective action is taken may be exceeded many times during the overall operating period. Because of this relatively small but frequent corrective action provided in accordance with the invention, both short term accuracy and long term accuracy are high and cumulative errors are eliminated.

It will be understood that the amount of information that has to be stored in the register is always small because the plus and minus deviations cancel when the average of the weights being produced is equal to the desired average. If the average being produced is not equal to the desired average, corrective action is initiated to prevent the sum from becoming very large. It will be appreciated that storing the algebraic sum of the deviations is much simpler than it would be to store the accumulated weight of all weighments and divide by the total weighments produced. This can be readily appreciated when it is considered that one ounce packages are frequently produced at the rate of 35 per minute, amounting to a total of 16,800 ounces in eight hours. The presently preferred embodiment of the invention would require a register with a capacity of less than 100 units. Further, the total error which can result with the system of the invention is very small and one is guaranteed that the total deviation from the average at the end of the operating period, i.e., at the end of a day's operation, is less than a predetermined amount since the system takes account of all weighments. This, of course, contrasts with sampling-type systems such as discussed above wherein prior samples are not taken into consideration in the next sample and no indication is provided of the total deviation from the average.

In a presently preferred embodiment, the invention comprises a combination of a "primary" weight control system and a deviation summing control system such as described above. The primary system includes conventional feeding and weighing devices and provides, for each weighment, (i) an indication of the deviation of the weighment from the desired average and (ii) an indication of whether or not the weighment is greater than a predetermined minimum. The feeding and weighing portion of this preferred embodiment allows a period for the scale to settle after the feed has stopped. The weight of the charge is then checked and if above the minus ("unreasonable") weight limit, a signal is issued to dump the charge and enter the weight in a register such as discussed above. If the charge is not above the minus weight limit, the weight is not entered in the register, and the process is repeated, i.e., the feeders start again, the scale is allowed to settle and the weight is again checked. The register only accepts the final weight just before the charge is dumped. When the sum in the register reaches a given level in either direction, a signal is provided to correct the primary control system. The system may also provide a warning that a predetermined larger error has accumulated and thus the system is no longer in control or may simply shut the system down pending corrective measures when this larger error is registered.

Other features and advantages of the invention will be set forth in, or apparent from, the detailed description of the preferred embodiments found hereinbelow.

DESCRIPTION OF THE PREFERRED EMBODIMENTS

As previously mentioned, a presently preferred embodiment of this invention comprises a combination of a "primary" weight control system and a secondary summation and control system. However, it should be understood that the summation and control system can also be used independently of such a system. Moreover, variations in the specific embodiment disclosed can also be effected. For example, in the embodiment discussed below, a gravimetric filler arrangement is used whereas a volumetric filler arrangement could also be used.

Figure 1:
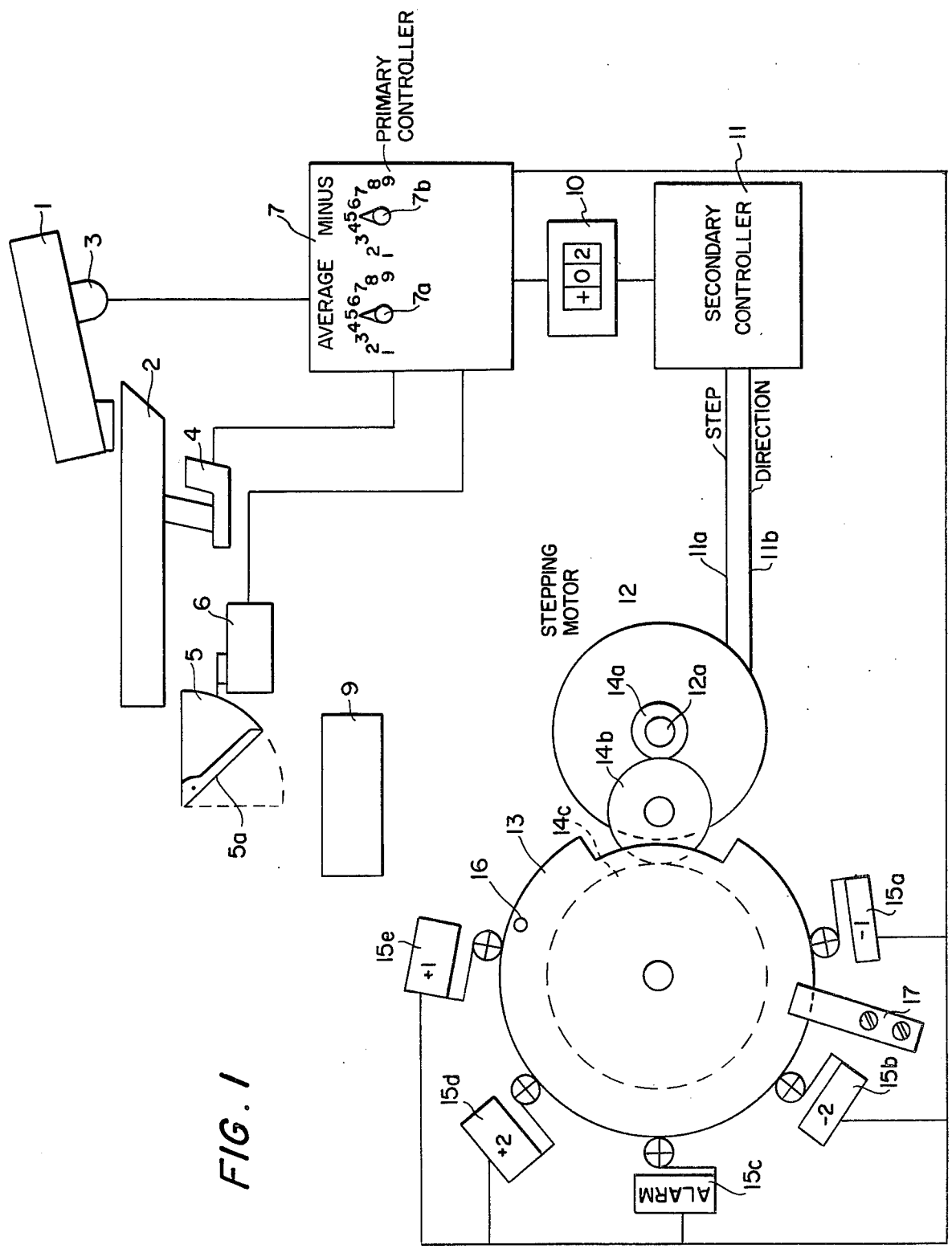
FIG. 1 is a schematic diagram, partially in block form, of a charge weight control system in accordance with a first embodiment of the invention.

Referring now to FIG. 1 a schematic representation of a first presently preferred embodiment of the invention is shown. The feeding and weighing system illustrated includes a supply hopper 1, a feed trough 2, a vibrator 3, an electromagnetic feeder 4, a weigh bucket 5 and a weigh cell 6, all of conventional construction. In operation, a supply of product is temporarily stored in supply hopper 1. This product is fed to feeder trough 2 by the action of electromagnetic vibrator 3 and moved down the feeder trough 2 by the action of electromagnetic feeder 4 into weigh bucket 5 which is supported by weigh cell 6.

The voltage to vibrator 3 and feeder 4 is controlled by a primary controller 7. Primary controller 7 acts upon information fed thereto from settings representing the desired average weight and the minum weight limit, as provided by control knobs 7a and 7b. Controller 7 also receives weight information from the weigh cell 6. Based upon previous weight information and the weight settings, controller 7 determines the weight at which power to the vibrator 3 and feeder 4 should be cut off. It will be appreciated that there is always some product that will fall into the weight bucket 5 after the cutoff weight signal is produced and that variations in the amount of product fed is the primary cause for variations in the final weight. In the system of FIG. 1, the weight of product is checked after allowing a suitable period for product to fall into the weigh bucket 5 and the scale 6 to settle. If the charge is above the minus weight setting as provided by control knob 7b, a mechanism (now shown) opens the door 5a of the weigh bucket 5 thereby dumping the contents of weigh bucket 5 into a receptacle 9. The weight of the dumped charge is also shown on a display 10 as a deviation from the desired average weight as provided by the setting of knob 7a. As discussed above, if the charge is not above the minus limit, the feed will restart and after cut off and a new settling period, the weight is again checked. At this time, the charge is either now up to weight, or the restart and feed cycle is repeated until the charge is up to weight. The primary controller 7, acting upon information from the particular weighment and previous weighments, determines whether and how much to change the scale cut off level.

Primary controller 7 can be implemented in a number of ways. For example, reference is made to U.S. Pat. Nos. 3,643,752 (Blodgett) and 3,742,569 (Blodgett). These patents disclose a weight control system which checks product charges and corrects those charges whose weight is below a minimum acceptable level by adding more product. The weight control system of these patents can be readily adapted to perform the functions of primary controller 7. This can be done by removing the stepping switch so as to maintain the mean weight of the charges at a predetermined level rather than holding the charges at a predetermined minimum weight level. Further, the output of the checkweigher would be fed to two separate control amplifiers rather than one. The first control amplifier would be adjusted to make certain that all charges met or exceeded the minimum acceptable weight and would be adapted to operate the feeder if the charges were below this weight. The second control amplifier would control the means weight by operating one or the other of the two solenoids associated with the ratchet wheel disclosed in the patents when checking each weighment. The ratchet wheel would thus be rotated so as to maintain an equilibrium position wherein the number of charges above the mean weight would be equal to the number of charges below the mean weight. While it is recognized that the mean weight of the charges would not necessarily be the same as the average weight, the results produced by the approach outlined above would be sufficiently close that the range of operation of the secondary control system described hereinbelow could be sufficient to effect the necessary offset adjustments to the set points of the mean weight control amplifier referred to so as to maintain the final weights at the desired average. It will be understood that this approach is merely exemplary and that those skilled in the art could readily devise other approaches in implementing primary controller 7.

As noted, display 10 provides an indication of the deviation of each weighment from the desired average, i.e., a display of the amount and direction of the deviation. This information is supplied to a secondary controller 11 each time a new dump weight is posted. The secondary controller 11 provides step and direction signals on lines 11a and 11b to a stepping motor 12 which serves, in effect, as a mechanical register. The motor 12 will move one step for each digit of the deviation and will move in the direction indicated by the input information as shown on display 10. In an exemplary embodiment, each digit of the input signal (and of the display) represents 1/16 ounce and the stepping motor moves clockwise for a positive deviation. As shown in FIG. 1, the display 10 shows that weight dumped from the weigh bucket 5 was 2/16, or ⅛ ounces above the desired average. In this case, the stepping motor 12 would therefore move two steps in the clockwise direction.

Stepping motor 12 includes an output shaft 12a having a drive gear 14a mounted thereon which drives a cam 13 through intermediate gears 14b and 14c. Movement of the stepping motor shaft will cause movement of cam 13 in the same direction through the action of gears 14a and 14b and 14c. Cam 13 includes a slot 13a in the periphery thereof which controls the actuation of series of snap-acting microswitches 15a, 15b, 15c, 15d and 15e located about the circumference of cam 13 as illustrated. In the exemplary embodiment under consideration, the gears 14a, 14b and 14c and motor 12 would be chosen such that twenty-five steps in the clockwise direction from the position shown in FIG. 1 would be required before the roller associated with snap acting switch 15a would drop off the periphery of cam 13 into slot 13 and hence cause actuation of switch 15a. When actuated, switch 15a produces a corrective signal which is applied to the primary controller 7 and which causes controller 7 to operate at one-sixtyfourth ounce less weight.

Under normal operating conditions, cam 13 will move clockwise and counterclockwise without operating any fo the micro-switches until a total deviation of 25/16 ounces from the desired total weight of all packages is accumulated. As stated, when this total deviation is exceeded in either direction a micro-switch (15a or 15b) will be actuated causing a correction in the primary feed system. This correction should normally cause the cam 13 to eventually move back to the zero correction region. However, if one step of correction does not overcome the error in the weights provided by the primary feed system, the total deviation will continue to accumulate until a 50/16 ounce total deviation is reached and a micro-switch (15b or 15c) is actuated which provides for two units of correction. Further, if two units of correction is not sufficient, the total deviation will be accumulated up to 75/16 ounce at which time switch 15c is operated. Switch 15c can be designed to issue a warning by actuating an audio or visual alarm or, alternatively, to simply shut down the weighing system. Obviously different alarm and correction levels can be used. A pin 16 located in cam 13 and a cooperating stop arm 17 disposed adjacent cam 13 prevent cam 13 from turning beyond plus or minus ½ revolution so as to prevent false signals which could result from moving past the alarm position.

In the exemplary embodiment of the invention described above, the mechanical register (stepping motor 12 and the mechanism associated therewith) issues a warning or provides other action when 75 units or errors are accumulated. In this embodiment, the units are 1/16 ounce each and thus in a system which produces 17,000 one ounce packages during a shift, the error at the end of the shift will by definition, be less than 75 units or less than 4 and 11/16 ounces in 17,000 ounces, an error of less than one part in 3,600 or 0.03 of 1%. It will be appreciated that, in operation, the control provided calls for small plus or minus corrections many times a day. Under these circumstances, the error register will pass through zero frequently. At each zero crossing of the register, the average of all previously made packages is perfect, that is, the actual average of all packages will be equal to the desired average. Hence the total production consists of many groups of packages with zero error while the error for the entire day is insignificant.

It should be pointed out that if the weight of each package were to be maintained in some sort of register and the total divided by the number of packages produced, the effect of the weight of each package on the average would constantly decrease and the sensitivity of the control system would change constantly. In addition, the retention of this information would be formidable considering the output of one weigher could be 50,000 packages over three shifts.

Figure 2:
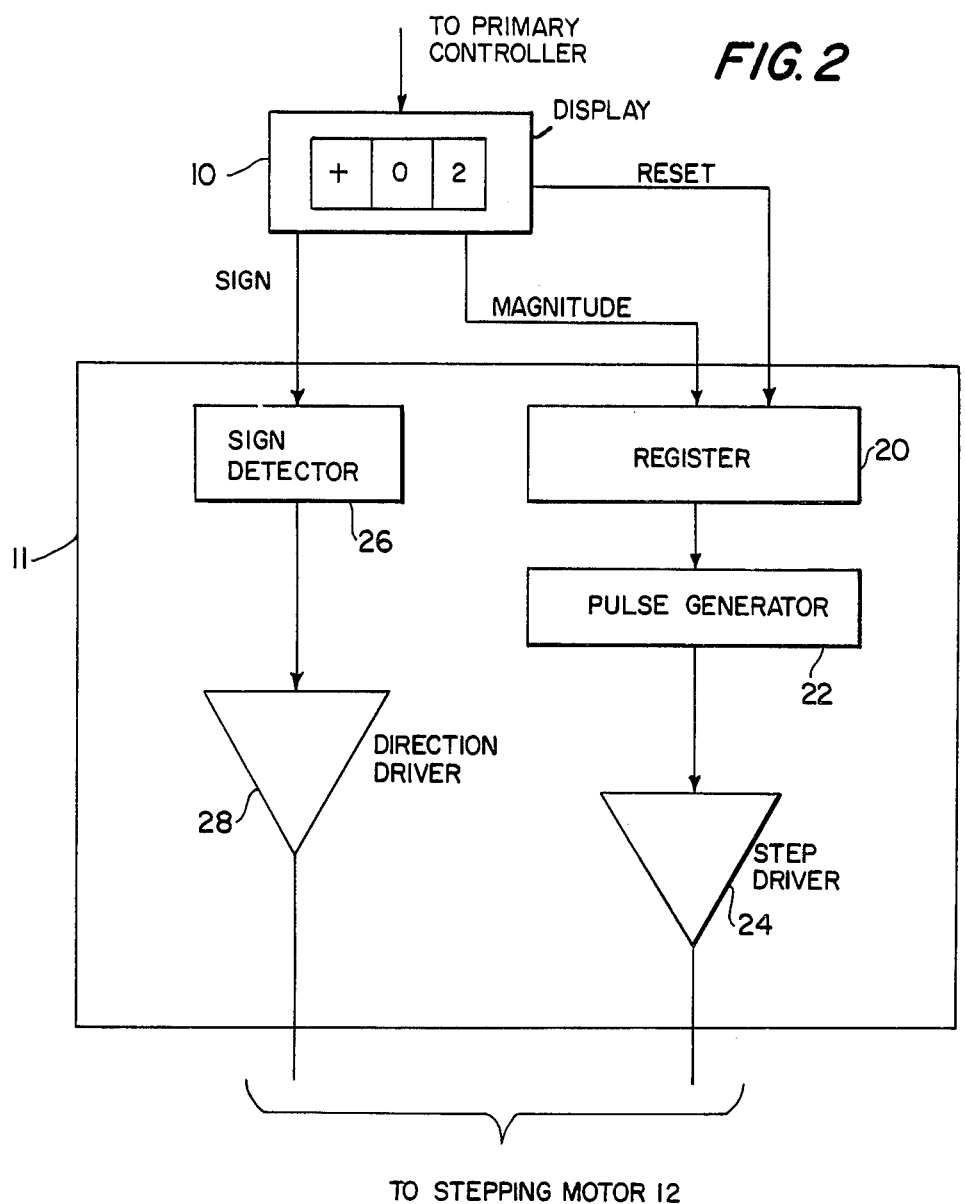
FIG. 2 is a block circuit diagram of a preferred embodiment of the secondary controller of FIG. 1.

Referring to FIG. 2, a preferred embodiment of the second controller 11 of FIG. 1 is shown. The controller includes a register 20 which is connected to the "magnitude" output of display 10, i.e., to the output indicative of the amount of the deviation from the average and to a "reset" output derived from the primary controller 7. Register 20 is connected to a pulse generator 22 whose output is applied to a step driver amplifier 24 which provides the "step" signal to stepping motor 12. A sign detector 26 is connected to the "sign" output of display 10, i.e., to the output indicative of the direction of the deviation. Sign detector 26 is also connected to a direction driver amplifier 28 which provides the "direction" signal to stepping motor 12. In operation, as indicated above, the display 10 shows the weight of the charge that was last dumped. This indication remains until a reset signal from the primary controller 7 signals that another charge has been dumped. When this signal is received by the secondary controller 11, the register 20 is cleared and the new weight value is stored. This reset signal also causes the pulse generator 22 to deliver a number of pulses, equal to the number in register 20, to the step driver 24 which, in turn, energizes the stepping motor 12. The direction that the stepping motor 12 moves is determined by the plus or minus sign on the display 10. This sign is detected by the sign detector 26 which places the direction driver 28 in condition to provide for movement of stepping motor 12 in the proper direction.

Figure 3:
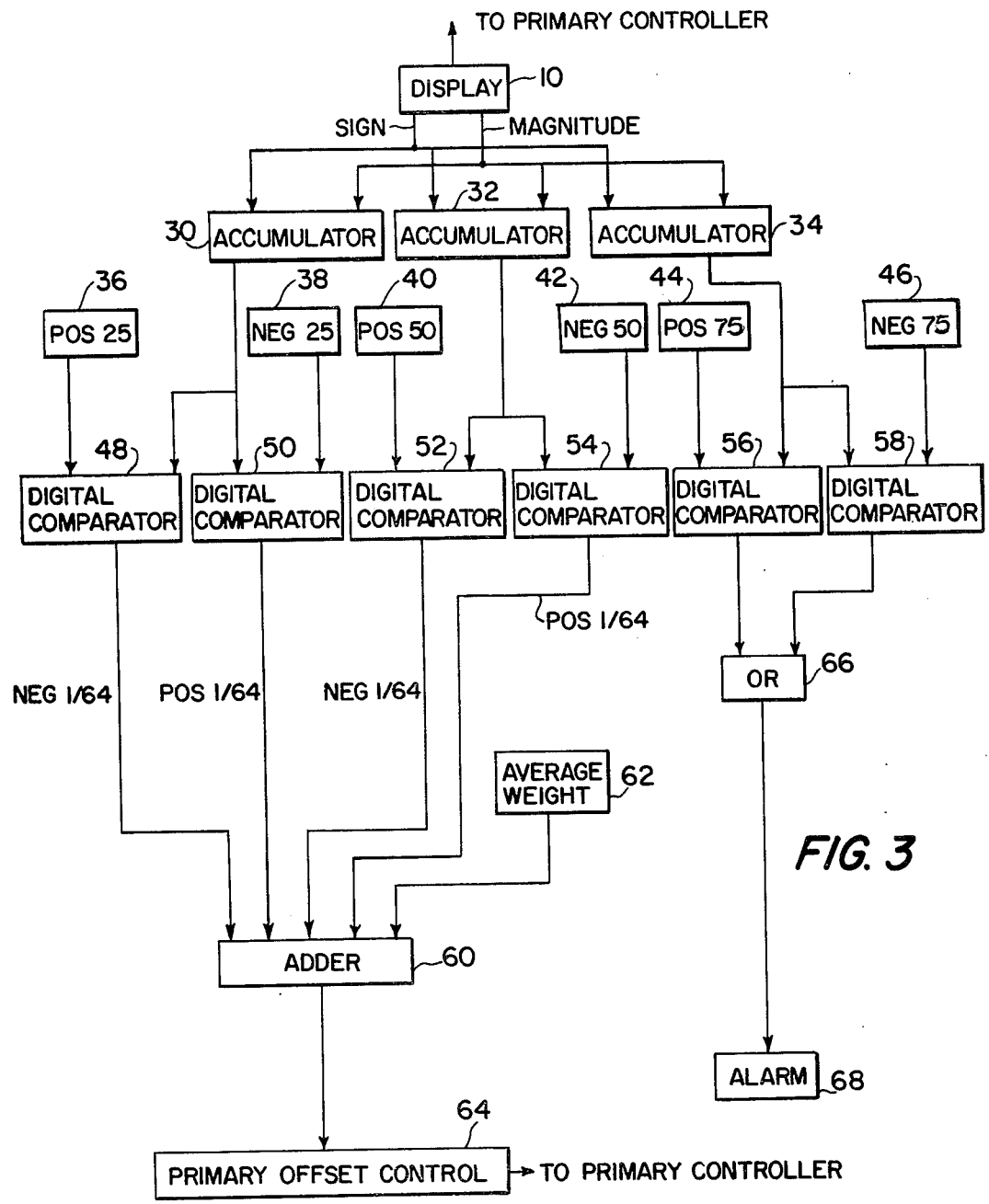
FIG. 3 is a block circuit diagram of an alternate embodiment of the secondary controller of the invention.

Referring to FIG. 3, a further preferred embodiment of the secondary control system of the invention is illustrated. The system shown in FIG. 3 performs the same functions electronically as does the corresponding electro-mechanical system of FIG. 1 and thus possesses a number of obvious advantages as compared with the latter.

In FIG. 3, display 10 corresponds to that discussed above in connection with FIG. 1 and produces output signals representative of the sign and magnitude of the deviation of each weighment from the desired average. A series of three accumulators 30, 32 and 34 is connected so that each receives the two signals. Accumulators 30, 32 and 34 store the newly received signals along with all of the previous signals and, because the signals are added algebraically, produce an output in accordance with the total net deviation from the average for all charges to date.

A plurality of memories 36, 38, 40, 42, 44, and 46 store the values positive (plus) 25, negative (minus) 25, positive 50, negative 60, positive 75, negative 75, respectively. A series of six digital comparators 48, 50, 52, 54, 56 and 58 is connected such that each receives an output from one of the accumulators and an output from one of the memories, as illustrated. For example, comparator 48 compares the "positive 25" output of memory 36 with the output of accumulator 30 and, in turn, produces an output signal when the output of accumulator 30 exceeds that of memory 36, i.e., when the total net deviation in the positive direction is greater than 25 units. Similarly, comparator 58 compares the output of accumulator 34 with the negative 75 unit digital signal stored by memory 46 and produces an output when the total net deviation in the negative direction is greater than 75 units.

The outputs of comparators 48, 50, 52 and 54 are connected to an adder 60 which also receives a signal from a memory 62 that stores the desired average weight. In the exemplary embodiment under consideration, each signal from the comparators provides a correction of 1/64 ounces in either the positive or negative direction. Thus, for example, if the accumulated deviation is −32, i.e., 32 units in the negative direction, output signals will be produced by both comparators 48 and 52 and two corrections of 1/64 ounces, i.e., a total correction of 1/32 ounce, will be provided. These corrections are algebraically added to the average weight signal produced by memory 62 so that a primary offset control circuit 64 receives a corrected average weight signal which is used to control the primary controller as set forth above.

The outputs of digital comparators 56 and 58 are connected to an OR gate 66 whose output controls the energization of an alarm 68. Thus, when either comparator 56 and 58 produces an output, thereby indicating that the total deviation in either the positive or negative direction is greater than 75 units, the alarm 68 is actuated.

It will be seen from the foregoing that, as was stated hereinabove, the system of FIG. 3 performs the same functions and produces the same results electronically as does the electro-mechanical arrangement of the secondary controller and the stepping motor and associated cam arrangement of FIG. 1. Moreover, it will be appreciated by those skilled in the art that the basic functions carried out by the specific embodiment illustrated in FIG. 3 can be easily carried out by a general purpose computer which could readily be programmed to provide the algebraic summation of the deviation from the average for each weighment and to store and compare the various quantities described above so as to produce the desired control signals.

Although the invention has been described relative to exemplary embodiments thereof, it will be understood that other variations and modifications can be effected in these embodiments without departing from the scope and spirit of the invention.

I claim:

1. A method for controlling the minimum weight and the average weight of charges of product prior to packaging said product so as to assure that no charges are below a given minimum weight and to maintain the average weights of the charges within predetermined limits over the operating period of the machine producing the product charges, said method comprising:

establishing an average weight and minimum weight for said charges;

weighing each of said charges;

determining whether the weight of each of the weighed charges is less than said minimum weight and modifying the charges whose weights are below said minimum weight so that the final weight of all charges is above said minimum weight;

determining the deviation of the final weight of each of said charges from said average weight so as to provide an indication of the amount and direction of the deviation from the average for each said charge;

summing algebraically all of the indications of the deviation from the average for each of said charges so as to produce, after each charge has been finally weighed, a running algebraic summation representative of the total net deviation from the average up through the charge which has just been weighed;

correctively controlling the production of the charges whenever the said algebraic summation exceeds a preselected level in either a positive or negative direction while continuing the summing process such that the each determination of whether said preselected level has been exceeded is based on the total number of charges produced up through the most recent charge.

2. A method as claimed in claim 1 wherein said modifying of the charges whose weights are below said minimum weight comprises adding product to said charge.

3. A method as claimed in claim 1 wherein said modifying of the charges whose weights are below said minimum weight comprises rejecting said charges.

4. A method as claimed in claim 1 wherein the machine producing the product charges is shut down when said algebraic summation exceeds a further, higher preselected level.

5. A method as claimed in claim 1 wherein an alarm signal is produced when said algebraic summation exceeds a further, higher preselected level.

6. A method for assuring that average weight of all charges produced prior to packaging is maintained within predetermined limits over the operating period for the machine producing the charges, said method comprising:

weighing each charge;

determining, for each weighment, the amount and the sign of the deviation from a predetermined average;

continuously summing algebraically each and every one of the said deviations whereby a running total of the deviations is provided which takes into account the sign and magnitude of each deviation;

providing corrective action each time that the algebraic sum produced by said summing step exceeds a given limit in either the positive or negative direction, the provision of each corrective action being based on the summation of all deviations up to that time; and producing a further signal when the algebraic sum produced by said summing step exceeds a higher given limit in either direction.

7. A method as claimed in claim 6 wherein said further signal comprises an alarm signal.

8. A method as claimed in claim 6 wherein said further signal comprises a signal for terminating the operation of the machine producing the charges.

9. An apparatus for controlling the minimum weight and the average weight of charges of product prior to packaging said product so as to assure that no charges are below a given minimum weight and to maintain the overall average weight of the charges within predetermined limits over the operating period of the machine producing the product charges, said apparatus comprising:

means for establishing an average weight and a minimum weight for said charges;

weighing means for weighing said charges;

controller means for determining whether the weight of each of said weighed charges is below said minimum weight and for producing a signal for modifying said charges so that the final weight of each of said charges is at least equal to said minimum weight; and for determining the deviation of the final weight of each of said charges from said average weight and for providing, responsive to said determination, an indication of the amount and direction of the deviation from the average for each said charge; and summation and control means for algebraically summing all of the indications of the deviation from the average for each of said charges so as to produce, after each charge has been finally weighed, a running algebraic summation representative of the total net deviation from the average up through the charge which has just been finally weighed; and for producing a corrective signal for controlling the production of charges whenever the said algebraic summation exceeds a preselected level in either a positive or negative direction while continuing to sum said indications of the deviation from the average for each charge.

10. An apparatus as claimed in claim 9 wherein said summation and control means comprising means for producing digital control signals representative of the direction and magnitude of each deviation.

11. An apparatus as claimed in claim 9 further comprising alarm means actuated responsive to a higher preselected level being exceeded.

12. An apparatus as claimed in claim 9 further comprising display means for displaying, in sequence, each of said indications of the deviation from the average.

13. An apparatus as claimed in claim 9 wherein said summation and control means comprises computer means.

14. An apparatus as claimed in claim 13 wherein said summation and control means further comprises a stepping motor responsive to said control signals.

15. An apparatus as claimed in claim 14 wherein said summation and control means further comprises switch means actuated responsive to movement of said stepping motor when a said preselected level is exceeded.

16. A method for assuring that the average weight of all charges produced prior to packaging is maintained at a predetermined desired level over the operating period of the machine producing the charges, said method comprising:

weighing each charge;

determining, for each weighment, the amount and the sign of the deviation from a predetermined desired level; and continuously summing algebraically each and every one of the said deviations so as to continuously provide an updated algebraic summation of the deviations from the predetermined level which takes into account the sign and magnitude of each deviation such that each time the summation is zero the actual average weight of all of the previously weighed charges is equal to the desired level, the said summing of said deviations being carried out over the entire operating period of the machine producing the charges.

* * * * *